(12) United States Patent
Bowers et al.

(10) Patent No.: US 7,146,069 B1
(45) Date of Patent: Dec. 5, 2006

(54) OPTICAL SYSTEM FOR SELECTABLE DELAY

(75) Inventors: John Edward Bowers, Santa Barbara, CA (US); Roger Jonathan Helkey, Montecito, CA (US)

(73) Assignee: Calient Networks, Inc., San Jose, CA (US)

( * ) Notice: Subject to any disclaimer, the term of this patent is extended or adjusted under 35 U.S.C. 154(b) by 0 days.

(21) Appl. No.: 10/456,436

(22) Filed: Jun. 5, 2003

(51) Int. Cl.
G02B 6/26 (2006.01)

(52) U.S. Cl. .......................................... 385/18; 385/25

(58) Field of Classification Search ............ 385/16–19, 385/24, 25
See application file for complete search history.

(56) References Cited

U.S. PATENT DOCUMENTS

| | | | |
|---|---|---|---|
| 4,723,827 A | 2/1988 | Shaw et al. | |
| 4,823,136 A | 4/1989 | Nathanson et al. | |
| 5,101,455 A | 3/1992 | Goutzoulis | |
| 5,125,051 A | 6/1992 | Goutzoulis et al. | |
| 5,477,350 A | 12/1995 | Riza et al. | |
| 5,583,516 A * | 12/1996 | Lembo | 342/375 |
| 5,793,907 A * | 8/1998 | Jalali et al. | 385/24 |
| 5,856,805 A * | 1/1999 | Page | 342/375 |
| 5,923,291 A * | 7/1999 | Page | 342/375 |
| 6,141,099 A * | 10/2000 | Wehner et al. | 356/450 |
| 6,204,947 B1 * | 3/2001 | Page | 398/161 |
| 6,249,626 B1 | 6/2001 | Bergmann | |
| 6,253,005 B1 | 6/2001 | Bergmann et al. | |
| 6,320,993 B1 | 11/2001 | Laor | |
| 6,483,961 B1 | 11/2002 | Helkey et al. | |
| 6,504,975 B1 | 1/2003 | Yamagata et al. | |
| 6,525,863 B1 * | 2/2003 | Riza | 359/290 |
| 6,526,198 B1 * | 2/2003 | Wu et al. | 385/18 |
| 6,567,574 B1 * | 5/2003 | Ma et al. | 385/16 |
| 6,567,576 B1 | 5/2003 | MacDonald | |
| 6,650,800 B1 * | 11/2003 | Litvin | 385/15 |
| 6,668,108 B1 | 12/2003 | Helkey et al. | |
| 6,728,433 B1 | 4/2004 | Bowers et al. | |
| 6,865,311 B1 * | 3/2005 | Li et al. | 385/17 |
| 6,882,766 B1 | 4/2005 | Corbalis et al. | |
| 2002/0085251 A1 * | 7/2002 | Ofek et al. | 359/117 |
| 2002/0159681 A1 | 10/2002 | MacDonald | |
| 2002/0164114 A1 * | 11/2002 | Golub et al. | 385/18 |

(Continued)

FOREIGN PATENT DOCUMENTS

WO WO 01/57902 A2 8/2001

(Continued)

OTHER PUBLICATIONS

Lee et al, OFC Mar. 2002, 4-b True Time-Delay Feeder Using MEMS Switches for Linear Phased-Array Antennas, p. 738-739.*

(Continued)

*Primary Examiner*—Sung Pak
(74) *Attorney, Agent, or Firm*—Blakely, Sokoloff, Taylor & Zafman LLP

(57) ABSTRACT

A system is described for providing selectable delay. A first converter converts a first electromagnetic signal into an optical signal. An optical switch is coupled to the first converter to provide selectable delay by selection of paths by a plurality of movable microelectromechanical system (MEMS) mirrors. The paths have respective measurable differences in delay for the optical signal. A second converter coupled to the optical switch converts the optical signal into a second electromagnetic signal. The differences in delay for the optical signal result in differences to delay for the second electromagnetic signal in comparison to the first electromagnetic signal. Relatively short delays are provided by the optical switch and relatively long delays are provided by a plurality of fiberoptic delay lines.

12 Claims, 13 Drawing Sheets

U.S. PATENT DOCUMENTS

| | | | |
|---|---|---|---|
| 2003/0044107 A1* | 3/2003 | Tamer et al. | 385/18 |
| 2003/0091271 A1 | 5/2003 | Gragone | |
| 2003/0202731 A1* | 10/2003 | Ionov et al. | 385/15 |
| 2004/0165523 A1 | 8/2004 | Morris et al. | |

FOREIGN PATENT DOCUMENTS

| | | |
|---|---|---|
| WO | WO 01/95007 A2 | 12/2001 |

OTHER PUBLICATIONS

D.A. Tulchinsky and P.J. Matthews, "Demonstration of a Reconfigurable Beamformer for Simplified 2-D, Time-Steered Arrays," 2000 IEEE MTT-S Digest, pp. 839-843 (Jun. 11, 2000).

Jonathan Lang, "Almost-All Optical Switching: Architectures, Protocols, and Anaylses," Ph.D. Thesis, University of California at Santa Barbara, CA (Dec. 1999).

J.P. Lang, et al., The Lamda-Scheduler: A Multiwavelength Scheduling Switch, J. Lightwave Technology, vol. 18, No. 8, pp. 1049-1063 (Aug. 2000).

G.A. Fish et al., "Compact, 4×4 InGaAsP-InP Optical Crossconnect with a Scaleable Architecture," IEEE Photonics Technology Letters, vol. 10, No. 9, pp. 1256-1258 (Sep. 1998).

B. Moslehi, et al., "Fiber-Optic Lattice Signal Processing," Proceedings of the IEEE, No. 72, No. 7, pp. 909-930 (Jul. 1984).

J.E. Bowers, S.A. Newton, and H.J. Shaw, "Fiber Optic Variable Delay Lines," Electronics Letters, vol. 18, No. 22, pp. 999-1000 (Nov. 1982).

B.L. Anderson and R. Mittal, "Polynomial based optical true time delay devices with microelectromechanical mirror arrays," Applied Optics, vol. 41, No. 26, pp. 5449-5461 (Sep. 10, 2002).

A. Goutzoulis, K. Davis, J. Zomp, P. Hrycak, and A. Johnson, "Development and field demonstration of a hardware-compressive fiber-optic true-time-delay steering system for phased-array antennas," Applied Optics, vol. 33, No. 35, pp. 8173-8185 (Dec. 10, 1994).

D. Pape and A. Goutzoulis, "New wavelength division multiplexing true time delay network for wideband phased array radars," Journal of Optics A: Pure and Applied Optics, vol. 1, No. 2, pp. 320-323 (Mar. 1999).

A. Goutzoulis and J. Zomp, "Development and field demonstration of an eight element receive wavelength multiplexed true time delay steering system," Applied Optics, vol. 36, No. 29, pp. 7315-7326 (Oct. 10, 1997).

D.A. Tulchinsky and P.J. Matthews, "Ultrawide-Band Fiber Optic Control of a Millimeter Wave Transmit Beamformer," IEEE Transactions on Microwave Theory and Techniques, vol. 49, No. 7, pp. 1248-1253 (Jul. 2001).

P.J. Matthews, M.Y. Frankel, and R.D. Esman, "A Wideband Fiber Optic True Time Steered Array Receiver," IEEE MTT-S Digest, pp. 347-350 (Jun. 1997).

P.J. Matthews, M.Y. Franker, and R.D. Esman, "A Wide-Band Fiber Optic True Time Steered Array Receiver Capable of Multiple Independent Simultaneous Beams," IEEE Photonics Technology Letters, vol. 10, No. 5, pp. 722-724 (May 1998).

B.L. Anderson, et al., "Optically Produced True Time Delays for Phased Antenna Arrays," Applied Optics, vol. 36, No. 32, pp. 8493-8503 (Nov. 10, 1997).

J.E. Bowers, et al., "The Multidisciplinary Optical Switching Technology (MOST) Center," Photonics Switching Talk, Tokyo, Japan, 8 pgs. (Dec. 2, 1996).

John E. Bowers, et al, "InGaAsP Optical Cross Connect Technologies," Invited Talk, 1999 OSA Annual Meeting, Santa Clara, California, 39 pgs. (Sep. 26-Oct. 1, 1999).

Multidisciplinary Optical Switching Technology Center (MOST) Final Report Aug. 1, 1996-Dec. 31, 2001, Program Managers: Robert Leheny and Lt. Col. Gernot Pomrenke, Director: John E. Bowers, Table of Contents and pp. 2-5, 8-11, 16-23, 34-35, 39-43, and 49-57.

Volkan Kama, et al., "Simultaneous OTDM Demultiplexing and Detection Using an Electroabsorption Modulator," IEEE Photonics Technology Letters, vol. 12, No. 6, pp. 711-713 (Jun. 2000) [included in Multidisciplinary Optical Switching Technology Center (MOST) Final Report Aug. 1, 1996-Dec. 31, 2001].

Volkan Kama, et al., "Integrated Tandem Traveling-Wave Electroabsorption Modulators for >100 Gbit/s OTDM Applications," IEEE Photonics Technology Letters, vol. 12, No. 11, pp. 1471-1473 (Nov. 2000) [included in Multidisciplinary Optical Switching Technology Center (MOST) Final Report Aug. 1, 1996-Dec. 31, 2001].

T. Le-Tien and D.T. Nguyen, "Performance of behaviour of scattering mechanisms in time-scale domain against random noise for centimetre wave radar," Electronics Letters, vol. 33, No. 22, pp. 1900-1901 (Oct. 23, 1997) [included in Multidisciplinary Optical Switching Technology Center (MOST) Final Report Aug. 1, 1996-Dec. 31, 2001].

Gregory A. Fish, et al., "Suppressed Modal Interference Switches with Integrated Curved Amplifiers for Scaleable Photonic Crossconnects," IEEE Photonics Technology Letters, vol. 10, No. 2, pp. 230-232 (Feb. 1998) [included in Multidisciplinary Optical Switching Technology Center (MOST) Final Report Aug. 1, 1996-Dec. 31, 2001].

Dan Marom, et al., "Femtosecond-rate space-to-time conversion," J. Opt. Soc. Am. B, vol. 17, No. 10, pp. 1759-1773 (Oct. 2000) [included in Multidisciplinary Optical Switching Technology Center (MOST) Final Report Aug. 1, 1996-Dec. 31, 2001].

Dan M. Marom, et al., "Linear and nonlinear operation of a time-to-space processor," J. Opt. Soc. Am. A, vol. 18, No. 2, pp. 448-458 (Feb. 2001) [included in Multidisciplinary Optical Switching Technology Center (MOST) Final Report Aug. 1, 1996-Dec. 31, 2001].

Dan M. Marom, et al., "Real-Time Spatial-Temporal Signal Processing with Optical Nonlinearities," IEEE Journal on Selected Topics in Quantum Electronics, vol. 7, No. 4, pp. 683-693 (Jul./Aug. 2001) [included in Multidisciplinary Optical Switching Technology Center (MOST) Final Report Aug. 1, 1996-Dec. 31, 2001].

Allen Shum, et al., "Design and Evaluation of the Fibonacci Optical ATM Switch," IEEE Transactions on Computers, vol. 50, No. 5, pp. 466-481 (May 2001) [included in Multidisciplinary Optical Switching Technology Center (MOST) Final Report Aug. 1, 1996-Dec. 31, 2001].

* cited by examiner

OPTICAL SYSTEM FOR SELECTABLE DELAY

FIELD

Embodiments of the invention relate to the field of time delay elements. More particularly, embodiments of the invention relate to the use of an optical system to introduce selectable delay in signals for phased array radar systems.

BACKGROUND

Variable or selectable time delay is useful for applications such as phased array radar, wherein the phase of the transmitted or received signal at each antenna element is adjusted in order to steer the transmitted or received beam. Phased array radar is typically used to determine speed and direction over a period of time. An example of a prior art antenna phased array system 100 is illustrated in FIG. 1. An X-band microwave oscillator 101 operating at 10 GHz, for example, drives an array of phase shift elements 102, which shift the phase of a signal output by oscillator 101. An array of electrical amplifiers 103 increases the signal powers, and an array of antenna elements 104 radiate the amplified, phase shifted versions of the signal output by oscillator 101 into free space, creating an electromagnetic radiation phase front 105, propagating in direction 106, which is perpendicular to phase front 105.

Antenna array system 100 is called a phased array given that a multiplicity of desired directions 106 of transmission may be obtained from the antenna array through a selection of phase via phase shift elements 102 for each antenna element 104. Variable phase shifters have been used to achieve beam steering over a narrow modulation frequency band. The phase shift elements 102 may have a phase shift that varies with modulation frequency, however, resulting in a beam direction 106 that changes with modulation frequency, referred to as squint. The best way to achieve the correct phase over a broad modulation bandwidth—for example +/−10% of the 10 GHz center frequency—is to use variable or selectable time delay elements, which helps to avoid squint.

An important goal of phased array radar systems has been to obtain true time delay without degrading the source signal through introduction of noise and loss in the delay lines. In the prior art, it has been difficult, however, to achieve variable time delay electrically. Long electrical delay lines are typically used for the long time delays and high modulation frequency required by many phased array radars. Long electrical delay lines typically have both large loss and large frequency dependence.

Optical subsystems using optical beam forming have been employed in the prior art to introduce delay. For example, optical subsystems have been used to convert the electrical signal output from oscillator 101 into an optical signal, manipulate the optical signal, then return the signal to the electrical domain prior to generating the phase front 105. For example, the electrical signal output from oscillator 101 is converted into an optical signal by amplitude modulation of an optical carrier. Optical frequency or phase modulation have also been employed in the prior art.

One prior art optical beam forming system is for radar transmission systems. The U.S. Naval Research Laboratory has demonstrated a transmit beamformer that provides squint-free 60-degree steering across the entire Ka band (i.e., 26.5 GHz to 40 GHz). D. A. Tulchinsky and P. J. Matthews, *Ultrawide band fiber optic control of a Millimeter wave transmit beamformer*, IEEE Trans. Microwave Theory and Techniques Vol. 49, No. 7, pp 1248–1253 (July 2001). The beamformer is based on dispersive prism optical delay lines.

Another prior art optical beam forming system is for phased array radar receivers. As described by P. J. Matthews, M. Y. Frankel, and R. D. Esman in *A Wideband Fiber Optic True Time-Steered Array Receiver*, IEEE MIT's Digest pp. 347–350 (Jun. 8, 1997), the U.S. Naval Research Laboratory has demonstrated receiver beam forming using photonics. The receiver demonstrated 60 degree steering across the 6–18 GHz region without squint and with 8 elements. This approach uses tunable lasers with dispersive delay lines.

Prior art beam forming with multiple beams has also been demonstrated in the prior art for a phased array radar receiver. P. J. Matthews, M. Y. Frankel, and R. D. Esman, *A Wide Band Fiber Optic True Time Steered Array Receiver Capable of Multiple Independent Simultaneous Beams*, IEEE Photonics Technology Letters, Vol. 10, No. 5 (May 1998). For this prior art system, eight modulated optical signals are fed to an eight-channel fiber-optic dispersive prism. The prism provides a wavelength-dependent time delay for each element channel, which is proportional to the position of the corresponding element in the array. Simultaneous multiple beams on reception provide fast switching.

Another prior art beam forming system involves two-dimensional beam steering. As discussed by D. A. Tulchinsky and P. J. Matthews in *Demonstration of a Reconfigurable Beamformer for Simplified 2-D, Time-Steered Arrays*, 2000 IEEE MTT-S Digest, pp. 839–42 (Jun. 11, 2000), two-dimensional beam steering has been demonstrated using an 8×8 optical switch matrix to get different delays. The prior art 8×8 optical switch matrix is a commercially-available device comprised of Mach-Zehnder interferometers and electronically controlled thermo-optic phase shifters, allowing control of which of the eight input ports is solely routed to one of the eight output ports.

Another prior art approach to optical beam forming is the White cell approach described by B. L Anderson and others in *Optically Produced True Time Delays for Phased Antenna Arrays*, Applied Optics, Vol. 36, No. 32, pp. 8493–8503 (Nov. 10, 1997). A White cell is a three-mirror optical cell designed originally by J. White. Optical beam forming is accomplished by using a device based on the White cell. The device uses a simple optical cavity comprising three spherical mirrors that recirculates a beam many times through the cell and refocuses the beam on each path. One of the major strengths of this approach is the fact that the number of delays scale quadratically (or higher) with the number of mirror bounces. This is an advance compared with previous fiber optic delay line work wherein a separate fiber is required for each delay.

SUMMARY

A system is described for providing selectable delay. A first converter converts a first electromagnetic signal into an optical signal. An optical switch is coupled to the first converter to provide selectable delay by selection of paths by a plurality of movable microelectromechanical system (MEMS) mirrors. The paths have respective measurable differences in delay for the optical signal. A second converter coupled to the optical switch converts the optical signal into a second electromagnetic signal. The differences in delay for the optical signal result in differences in delay for the second electromagnetic signal in comparison to the first electromagnetic signal.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of the present invention provide true time delay and minimize noise and loss in the delay lines. As described in more detail below, modulated electrical signals are converted to optical signals and introduced into an optical delay apparatus. The optical delay apparatus introduces a desired amount of delay to one or more of the optical signals corresponding to the delay required of the corresponding initial electrical signals. The optical signals are then converted back into the electrical domain, having a delay corresponding to the introduced optical delay. For one embodiment, the optical delay apparatus comprises an optical switch configuration that includes fiberoptic delay lines. For another embodiment, the optical switch includes a dielectric optical element that provides additional delay.

Figure 1:
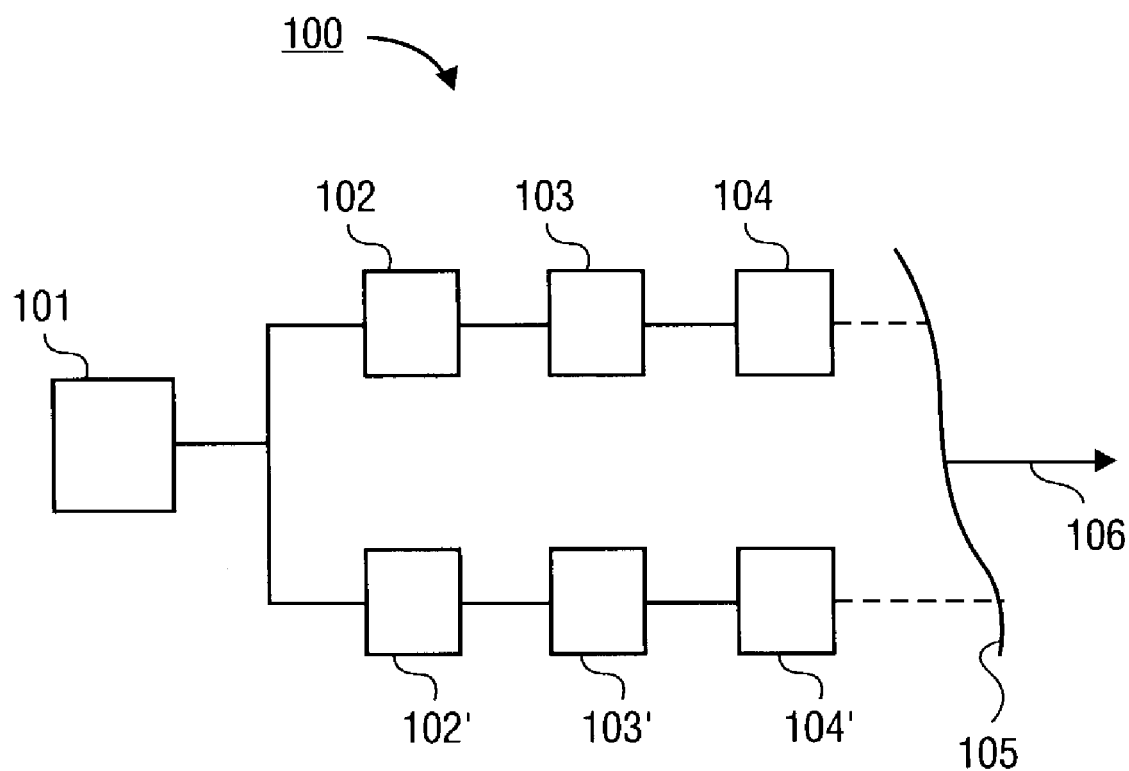
FIG. 1 shows an example of an antenna array system according to the prior art.
Figure 2:
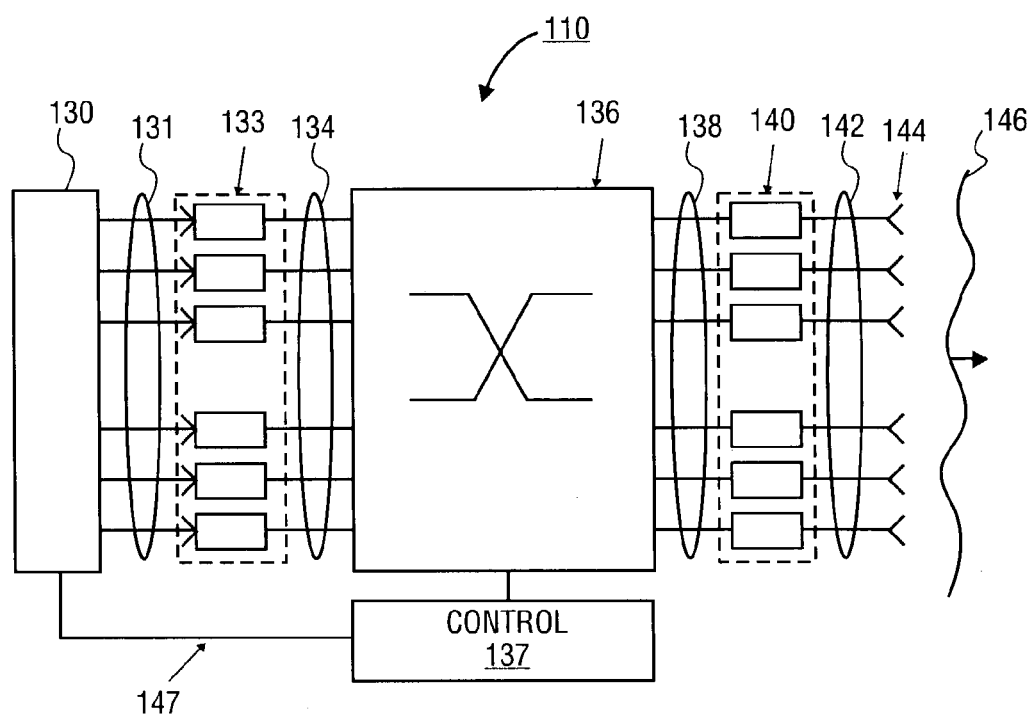
FIG. 2 shows a block diagram of a system for a phased array radar transmitter according to one embodiment the present invention.

FIG. 2 is a block diagram 110 for providing selectable delay for a phase array radar transmitter. Phased array radar transmitter 130 sends out modulated electromagnetic signals on lines 131. Converters 133 convert the electromagnetic signals into optical signals that are sent on fiberoptic lines 134 to optical switch 136, also referred to as photonic switch 136.

Optical switch 136 is a nonblocking switch, which means that any combination of input ports can be coupled to any combination of output ports. For an alternative embodiment, optical switch 136 has a blocking configuration.

For one embodiment, optical switch 136 is comprised of one or more arrays of the electromechanical system (MEMS) mirrors (not shown) that are under the control of control circuitry 137. The MEMS mirrors are used to reflect the optical signals to provide selectable paths between the input and output of optical switch 136.

For one embodiment, optical switch 136 has 300 input ports (i.e., 300 input fiberoptic lines) and 300 output ports (i.e., 300 output fiberoptic lines). For one embodiment, the optical signal loss per pass through optical switch 136 is on the order of approximately 1.5 decibels. For other embodiments, optical switches with other port sizes and other optical losses are used.

Control circuitry 137 allows the selection of various paths for the optical signal from the input side of the optical switch 136 to the output side of the optical switch 136. The various paths in optical switch 136 have different associated delays for the optical signal.

For other embodiments, additional delay is provided by a dielectric optical element within optical switch 136 or by fiberoptic delay lines coupled to or residing within optical switch 136. For other embodiments, the optical signals can pass through optical switch 136 a number of times before exiting optical switch 136 in order to increase delays.

For one embodiment, control circuitry 137 is in turn controlled via line 147 by phase array radar transmitting circuitry 130. This allows the phase array radar transmitting circuitry 130 to select and control delay within system 110 by controlling optical switch 136.

Optical switch 136 outputs optical signals on lines 138. Converters 140 convert the optical signals into modulated electromagnetic signals that are sent on lines 142 to antennas 144. Antennas 144 convert the electromagnetic signals into an electromagnetic radiation phase front 146 that is transmitted.

The direction of transmission of the electromagnetic radiation phase front 146 depends on the delays in the electromagnetic signals on lines 144. The delays in the electromagnetic signals on lines 142 are related to the delays selected by control circuitry 137 with respect to optical switch 136.

Figure 3:
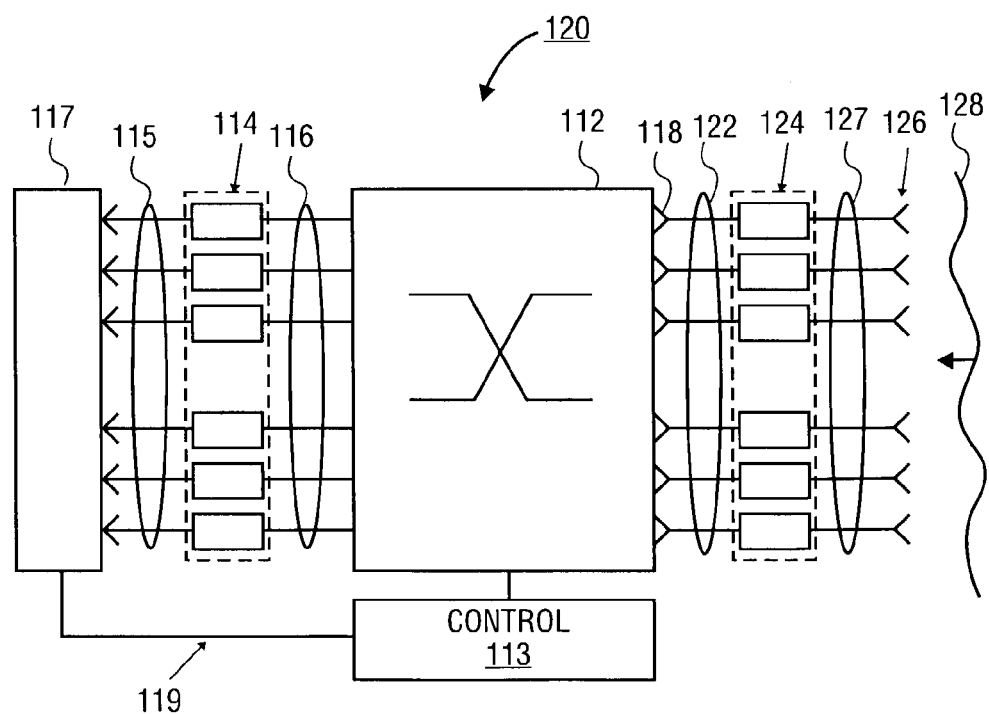
FIG. 3 shows a block diagram of a system for a phased array radar receiver according to one embodiment the present invention.

FIG. 3 is a block diagram of a system 120 for providing selectable delay for a phased array radar receiver. Antennas 126 receive an electromagnetic radiation phase front 128. The antennas 126 convert the electromagnetic radiation phase front 128 into modulated electromagnetic signals that are sent on lines 127 to converters 124. Converters 124 convert the incoming electromagnetic signals on lines 127 into respective optical signals that are sent onto respective fiberoptic lines 122.

For one embodiment, one-by-two optical splitters 118 are employed to split each of the optical signals on fiberoptic lines 122 into two optical signals. For other embodiments, no optical splitters are used. For yet other embodiments, other types of optical splitters are used.

For the system 120 shown in FIG. 3, the optical signals are sent by optical splitters 118 to optical switch 112, which is also referred to as photonic switch 112. For one embodiment, optical switch 112 is a nonblocking switch. For an alternative embodiment, optical switch 112 can be configured as a blocking switch.

The optical outputs of optical switch 112 are sent on fiberoptic lines 116 to converters 114. Converters 114 convert the optical signals to modulated electromagnetic signals that are sent on lines 115 to receiver circuitry 117 of the phased array radar system.

The delay within system 120 is selectable. Control circuitry 113 selects the optical paths through optical switch 112. Each of the paths through switch 112 has a particular associated delay. For one embodiment, the delays within optical switch derive from the paths between input and output ports. For other embodiments, additional delay is provided within optical switch 112 by a dielectric element (not shown). For other embodiments, additional delay is provided by fiberoptic delay lines (not shown) either a part of or coupled to optical switch 112. For other embodiments, the optical signals can pass through optical switch 112 a number of times before exiting optical switch 112 in order to increase delay times.

The delay provided by optical switch 112 results in the electrical signals on lines 115 having an associated delay. In other words, the delay in the optical domain results in delay in the electrical domain.

For one embodiment, control circuitry 113 is coupled to phased array radar receiving circuitry 117 via line 119. Phased array radar receiving circuitry 117 uses control circuitry 113 to control optical switch 112 to in turn control delay within system 120.

For system 120, the delay provided by optical switch 112 results in delayed electrical signals on lines 115. Delay on individual lines 115 can change the perceived direction of wavefront 128 by the phased array radar system receiver circuitry 117.

For a phased array radar system employing transmitter 110 and receiver 120, appropriate delays would be set for transmitter 110 via control circuitry 137 and for receiver 120 via control circuitry 113. For example, a phased array radar system may sweep across the sky looking for an airplane. If the airplane is at an angle to the phased array radar system and not straight on, then control circuitry 137 will introduce delays in the transmitter so that the radar wave front reaches the airplane. The control circuitry 113 will accordingly introduce appropriate delays in the receiver 120 based on the delays introduced in the transmitter 110 in order to get meaningful results from the receiver 120. In other words, delays are introduced into transmitter 110 and receiver 120 based on the same parameters. Delays are introduced into transmitter 110 to sweep across the sky. Control circuitry 113 does geometric mathematical calculations to calculate the delays necessary for receiver 120 to get meaningful results.

Control circuitry 137 and 113 can be comprised of microprocessors or microcontrollers that calculate the appropriate delays necessary for the various radar fronts sent by transmitter 110 and received by receiver 120. For certain embodiments of the invention, control circuitry 137 and 113 need not employ parallel processing in order to calculate appropriate delays. For alternate embodiments, however, control circuitry 137 and 113 includes parallel processing to calculate delays.

For an alternative embodiment, systems 110 and 120 are combined to form a phased array radar system that is both a transmitter and a receiver with combined control circuitry. For alternative embodiments the combined phased array radar transmitter and receiver can have one or more optical switches.

Figure 4:
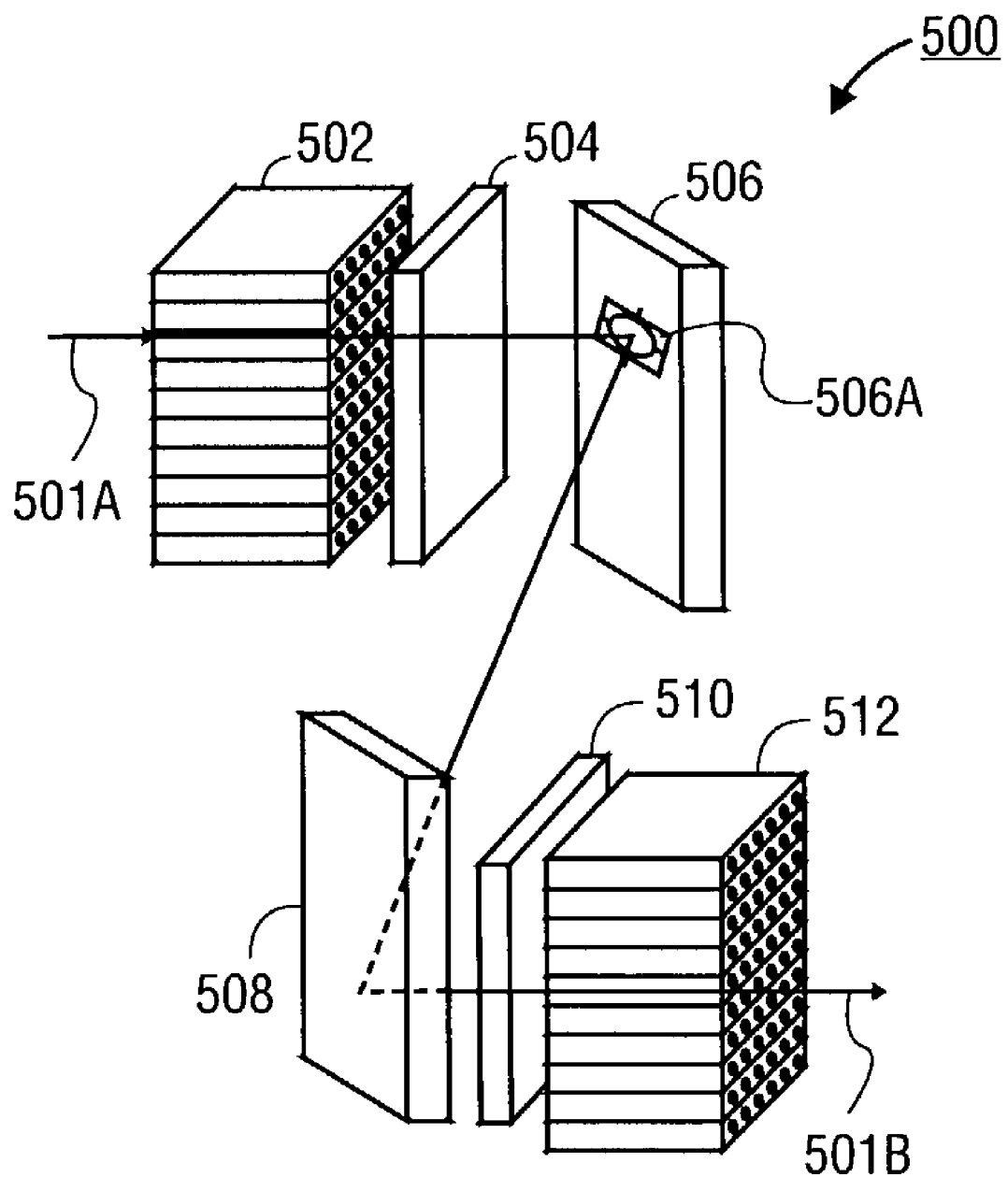
FIG. 4 illustrates an optical switching apparatus with microelectromechanical systems ("MEMS") mirrors that is a part of a core of an optical delay apparatus according to one embodiment of the invention.

FIG. 4 illustrates an optical switch core 500 for achieving selectable delay. Optical switch 500 could be used as optical switch 136 in FIG. 2 or as optical switch 112 in FIG. 3. Optical switch 500 includes an input fiber array 502, an input lens array 504, input and output MEMS mirror arrays 506 and 508, an output lens array 510, and an output fiber array 512. Optical switch 500 is also referred to as photonic switch 500.

For various embodiments, the optical signals used by optical switch 500 can be visible light, infrared light, or ultraviolet light. For example, one embodiment of optical switch 500 operates at wavelengths of 1.3 microns to 1.5 microns, which is near infrared.

According to the configuration of FIG. 4, multiple optical inputs are used with an equal number of lenses to produce an equal number of approximately collimated input optical beams. The input and output fiber blocks 502 and 512 are typically comprised of a two dimensional array of fibers with a polished end faces. The input fiber block 502 is positioned adjacent to the input lens array 504 to provide collimated input beams. The output lens array 510 is positioned adjacent to the output fiber block 512 to couple collimated output beams into output fiber block 512. Optical beams are said to be collimated when the diameter of the beams does not change substantially as the beam propagates, although some change in optical beam diameter still occurs due to diffraction.

The input and output mirror arrays 506 and 508 each include a plurality of movable MEMS mirrors, such as mirror 506a. Mirror arrays 506 and 508 reside within an optical chamber of optical switch 500. Each mirror in the input and output mirror arrays 506 and 508 can be rotated about two orthogonal axes so that an input beam received on any one of the input fibers can be directed towards any one of the output fibers by appropriately adjusting the orientation of their associated mirrors via electrostatic actuation.

For optical switch 500 of FIG. 4, the mirrors within mirror arrays 506 and 508 rotate in two axes. For optical switch 500, switching occurs in a three-dimensional volume of free space, and thus the switching configuration is described as three dimensional ("3D"). Optical switch 500 is referred to as a three-dimensional (3D) optical switch.

Dielectric optical elements (not shown) can be placed between input fiber array 502 and output fiber array 512 to increase the differential delay between input and output fibers.

For an alternative embodiment, input lens array 504 and output lens array 510 have various sizes of lenses that provide respective different optical delays. For that alternative embodiment, mirror arrays 506 and 508 have mirrors of various sizes in view of the use of various size lenses in input lens array 504 and output lens array 510.

Mirror arrays 506 and 508 that rotate in two axes are commercially available, for example from Analog Devices, Inc. of Cambridge, Mass. Large differential delay between various switch paths is better achieved, however, with large mirror deflection angles. One embodiment using mirror arrays 506 and 508 that can achieve large deflection angles uses a blade actuator to rotate the mirrors, such as that disclosed in PCT International Publication No. WO 01/57902 A2, published Aug. 9, 2001, entitled *Electrostatic Actuator for Microelectromechanical Systems and Method of Fabrication*.

For optical switch 500, the input fibers 502 and input lenses 504 are fixed arrays. Steering of the optical beam can also be performed, however, by changing the position of the fibers and lenses. For one embodiment, the optical beams are steered by changing the relative position of the lenses with respect to the fibers. Alternately, optical switching can be accomplished by rotating or translating the fiber and lens as a unit.

Figure 5:
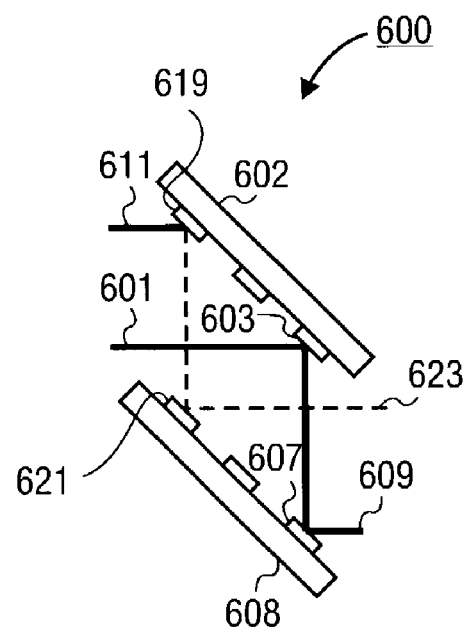
FIG. 5 illustrates a cross-section of a switching mirror array configuration where the input mirror array and the output mirror array are parallel.

The input mirror array 506 and output mirror array 508 of switch 500 can be placed in a variety of configurations to achieve variations in time delay through the switch. The cross-section of a parallel mirror array configuration 600 is shown in FIG. 5.

Input optical signal beam 601 reflects off input MEMS mirror 603, which is part of MEMS mirror array 602. Optical signal beam 601 is then in turn reflected off output MEMS mirror 607, which is part of parallel MEMS mirror array 608. After reflecting off mirror 608, the beam becomes output optical signal beam 609. Input optical signal beam 611 reflects off input MEMS mirror 619 and then off output MEMS mirror 621 to become output optical signal beam 623.

Due to the geometry of the movable MEMS mirrors that are part of the arrays 602 and 608, different paths between the input MEMS mirrors of array 602 and the output MEMS mirrors of array 608 have different respective delays.

Figure 6:
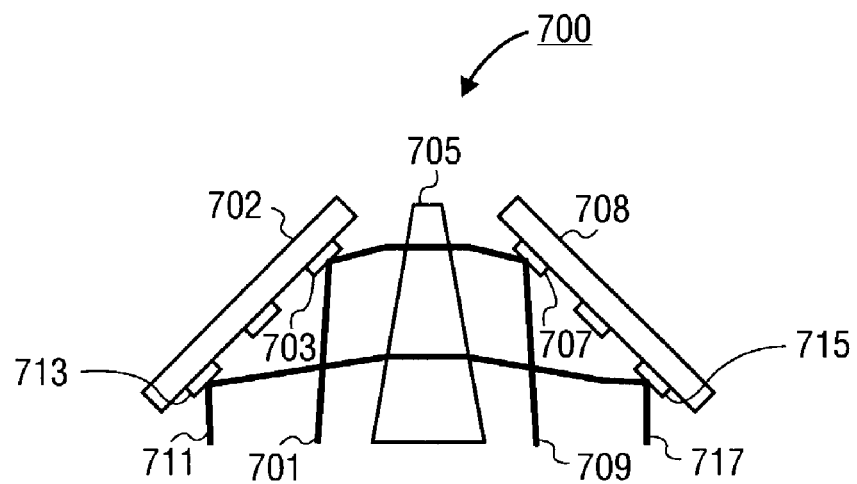
FIG. 6 illustrates a cross-section of a switching mirror array configuration that includes an optical element and wherein the input mirror array and the output mirror array are not parallel.

The cross-section of a mirror array configuration 700 wherein the input mirror array 702 and the output mirror array 708 are not parallel is shown in FIG. 6. Array 702 is an array of movable MEMS input mirrors. Array 708 is an array of movable MEMS output mirrors. Array 702 is not parallel to array 708.

Optical signal beam 701 reflects off input MEMS mirror 703 and then passes through transparent dielectric material 705, also referred to as optical element 705. Beam 701 then reflects off output MEMS mirror 707 and forms output signal beam 709. Optical signal beam 711 reflects off input MEMS mirror 713 and then passes through another part of transparent dielectric material 705. Beam 711 then reflects off output MEMS mirror 715 and becomes output signal beam 717.

Due to the geometry of the mirrors, different paths between the different mirrors of input MEMS mirror array 702 and the mirrors of output MEMS mirror array 708 have different delay.

Dielectric material 705 has a higher optical index and slower light propagation than free space. Thus, dielectric material 705 increases the relative delay between optical switch paths, as different optical switch paths experience a different amount of additional delay.

For one embodiment, dielectric material 705 is glass. For another embodiment, dielectric material 705 is quartz. For other embodiments, optical element 705 can be fabricated from other types of materials that have similar optical properties.

For one embodiment, optical element 705 is substantially wedge-shaped. For one embodiment, optical element 705 is a prism.

Figure 7:
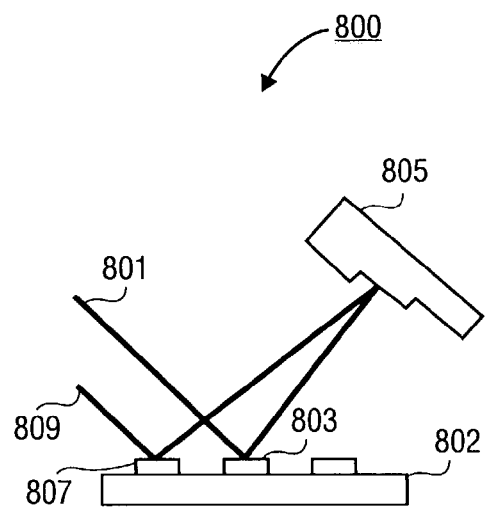
FIG. 7 illustrates a cross-section of a reflective mirror array configuration.

The cross-section of a reflective mirror array configuration 800 is shown in FIG. 7. One of the input optical signal beams 801 is shown. Mirror array 802 contains both input mirrors, such as input mirror 803 and output mirrors, such as output mirror 807. The mirrors of array 802 are movable MEMS mirrors. Input optical signal beam 801 reflects off an input mirror 803, reflects off a fixed mirror 805, reflects off an output mirror 807, and becomes an output optical signal beam 809.

Due to the beam and mirror placement geometry, different paths between different input mirrors 803 and output mirrors 807 have different time delays. For one embodiment, mirror 805 enhances the differential delay by having a stepped reflective surface as shown to change the optical path length depending on the particular input and output mirror. For another embodiment, mirror 805 is not stepped, but instead is planar.

For an alternative embodiment, an optical element, such as optical element 705 of FIG. 6, is placed between fixed mirror 805 and MEMS mirror array 802 of FIG. 7 to enhance the relative delay between optical paths.

Figure 8:
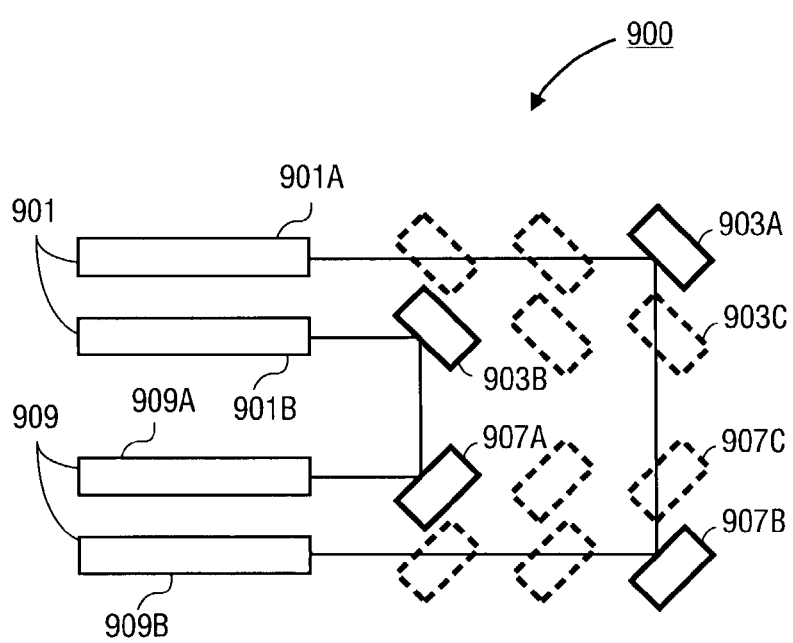
FIG. 8 illustrates a cross-section of an optical switch with internal time delay using mirrors that rotate or translate in one axis.

FIG. 8 shows a cross-section of an optical switch 900 according to one embodiment of the invention with internal time delay using movable MEMS mirrors that rotate or translate in one axis. A moveable MEMS mirror that translates lifts up into a vertical position from a horizontal position in order to reflect light. The mirror can then drop down into a horizontal position when reflection is no longer desired. A moveable MEMS mirror that rotates operates by rotating into a vertical position from a horizontal position in order to reflect light. The mirror can then rotate to a horizontal position when reflection is no longer desired. For the optical switch of FIG. 8, the mirrors are said to rotate or translate in one dimension (1D), and switching is said to occur in two dimensions (2D).

As shown in FIG. 8, an array of optical input beams 901 and optical output beams 909 lie in a single plane. Input beam 901*a* is switched to become output beam 909*b* by reflection off input mirror 903*a* and output mirror 907*b*. Other mirrors in the path, including input mirror 903*c* and output mirror 907*c*, are left in a lowered position so as to not intersect the optical beams. Similarly, input beam 901*b* is switched to become output beam 909*a* by reflection off input mirror 903*b* and output mirror 907*a*. In this example, input beam 901*b* is switched to become output beam 909*a* with less delay than when input beam 901*a* is switched to become output beam 909*b* due to the shorter optical path length. The principles for building arrays of mirrors that switch in two dimensions is well known to those skilled in the art, and devices are commercially available from Optical Micro Machines of San Diego, Calif.

The optical switch 500 of FIG. 4 can provide relatively small delay times to the optical signals. This is because the distance between the two MEMS mirror arrays 506 and 508 is 5 to 10 centimeters within the optical chamber of optical switch 500 for some embodiments. In order to achieve higher delays, the MEMS optical switch can be made larger, but a larger design would lead to larger optical loss and possibly slower switching times for optical switch 500. For example, the distance between mirror arrays 506 and 508 can be extended to 30 centimeters for other embodiments.

Another approach to changing the delay times provided by optical switch 500 is to vary the wavelength of optical signals passing through optical switch 500.

Figure 9:
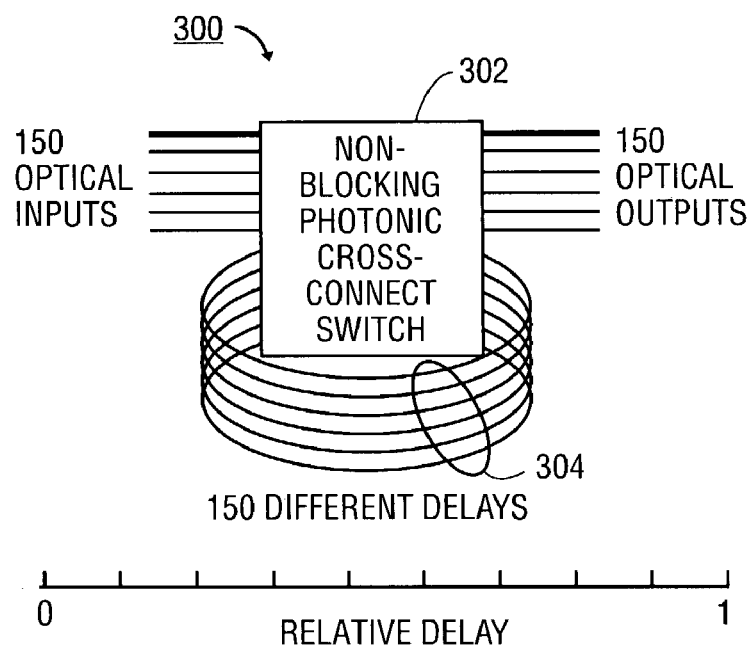
FIG. 9 shows a single-loop optical delay apparatus according to one embodiment of the present invention.

Yet another approach to increasing delay times of an optical switch is shown in FIG. 9. In FIG. 9, fiberoptic delay lines 304 are added to a non-blocking photonic (optical)

cross-connect switch 302, which is an optical switch core similar to optical switch 500 of FIG. 4. Fiberoptic delay lines 304 reside external to the optical switching cavity of optical switch 302 but are coupled to optical switch 302. Light does not diffract within fiber optic delay lines 304, so fiberoptic delay lines 304 can be made relatively long to provide relatively large delay values. This is in comparison with the relatively shorter delay values provided by various light paths between the mirror arrays of relatively small optical chambers of optical switches such as optical switch 500.

In general for an N port switch configuration 300, there can be M different delays and N-M inputs. Typically, this might be 150 inputs and 150 different delays for a switch with 300 ports. The delays introduced by fibers 304 might be organized in equal increments from a minimum delay to a maximum delay. Due to the low loss of optical fiber, optical delay lines can have an acceptable transmission loss and frequency-dependant loss even for very long time delays. The attenuation of optical fiber is thousands of times smaller at X band, and the dispersion of the delay is thousands of times smaller than comparable delay lines of copper. Furthermore, one optical fiber can carry multiple different signals with minimal interaction because fiber is highly linear.

The optical (photonic) switch 302 is fully non-blocking, so any input fiber can be connected to any output fiber. Hence for an increment of 0.05 ns, any of the 150 delays from 0 ns to 7.5 ns can be achieved for paths through fiberoptics delay lines 304 ignoring fixed delays common to all ports and ignoring delays within switch 302 other than those of the fiberoptic delay lines. For this configuration, once a particular fiber is used for a particular input, it is not available for other inputs, so this approach may not meet the needs of every application. In general, multiple delays are required for each input. For 6 bit resolution, 6 delay lines should be used for each input to guarantee that any input can have any delay.

Figure 10:
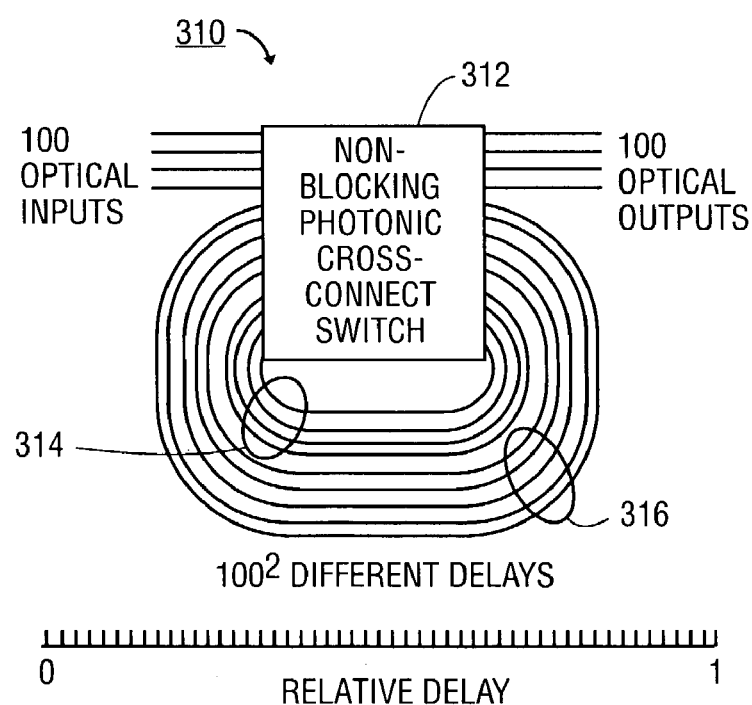
FIG. 10 shows a dual-loop optical delay apparatus according to one embodiment of the present invention.

As shown in FIG. 10, another possibility is to have every input pass through the non-blocking photonic cross-connect switch 312 twice. For configuration 310 of FIG. 10, one set of delay fibers 316 has a course delay increment and one set of delay fibers 314 has a fine delay increment. For example, there could be 100 input fibers. The coarse increment could be 1.0 ns and the fine increment could be 0.01 ns. Then any of the 10,000 delays from 0 to 100 ns in increments of 0.01 ns could be achieved. The more general case is summarized in Table 1, wherein each input passes through the switch from one to eight times, depending on the number of fiber groups. With a 300 port switch and 267 fibers connected from output to input, there can be 33 input fibers that can each have more than 1 trillion different delays, although once a particular fiber is used for a particular input, it is not available for other inputs.

For applications where completely independent sets of delay values must be achieved, Table 2 summarizes what can be done with binary delay lengths. A 300 port switch can support 7 bit delays on 33 input ports.

TABLE 1

| Fiber Groups | Input Fibers | Number of Delays |
|---|---|---|
| 1 | 150 | 150 |
| 2 | 100 | 10,000 |
| 3 | 75 | 421,875 |
| 4 | 60 | 12,960,000 |
| 5 | 50 | 312,500,000 |

TABLE 1-continued

| Fiber Groups | Input Fibers | Number of Delays |
|---|---|---|
| 6 | 42 | 5,489,031,744 |
| 7 | 37 | 94,931,877,133 |
| 8 | 33 | 140,641,000,000,000 |

TABLE 2

| Input fibers | Digital resolution | Number of delays |
|---|---|---|
| 100 | 1 | 2 |
| 75 | 2 | 4 |
| 60 | 3 | 8 |
| 50 | 4 | 16 |
| 43 | 5 | 32 |
| 37 | 6 | 64 |
| 33 | 7 | 128 |

Figure 11:
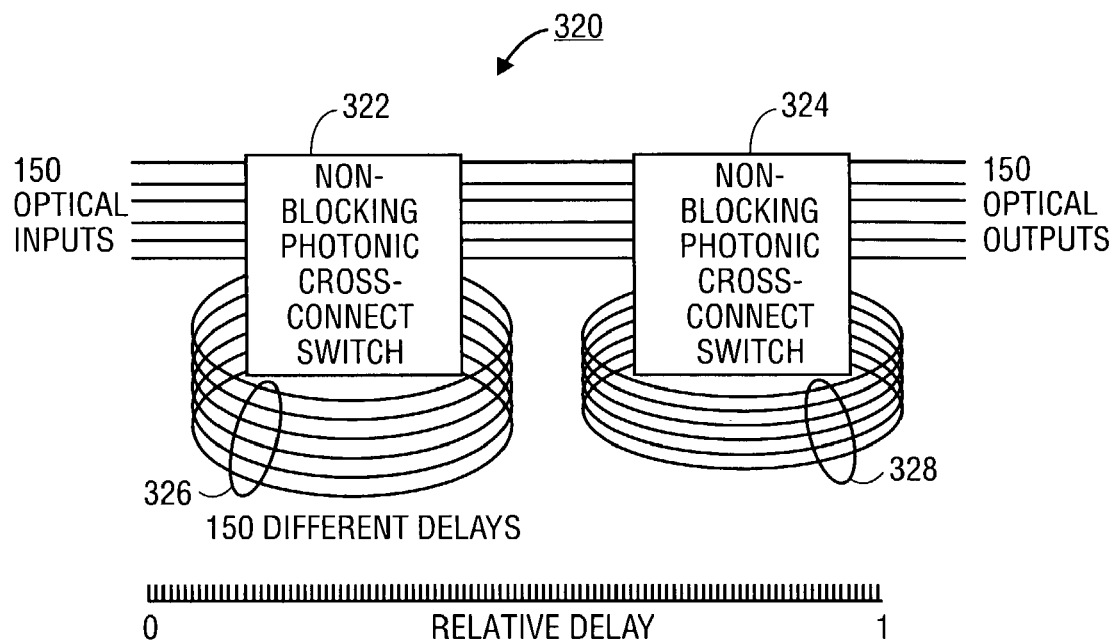
FIG. 11 shows a dual-switch, single-loop optical delay apparatus according to one embodiment of the present invention.

As shown in FIG. 11, if many different delays and/or many inputs are required, one approach is to place two non-blocking photonic cross-connect switches 322 and 324 in series. For configuration 320 of FIG. 11, every signal passes through each of switches 322 and 324 twice. We assume, however, that it matters which output port the signal comes out on. If the outputs are just going to be added together, as in some forms of phased arrays, then there is no need to go through the second switch twice. For 300 port switches, there can be 150 different inputs, each of which can have 1 of 3.3 million different delays. Of course, while each switch is completely non-blocking, each of the delay fibers can only be used by one input, so the system is not completely non-blocking.

There are several ways to use two increments of delay around each of two switches. One approach is as shown in FIG. 11, but with two sets of delay fibers 326 and 328 around each switch. One can have 100 input fibers, yet have 20 billion different delays. You get a factor of 2 instead of 100 because the center stage does not multiply, but has 200 different delays.

Figure 12:
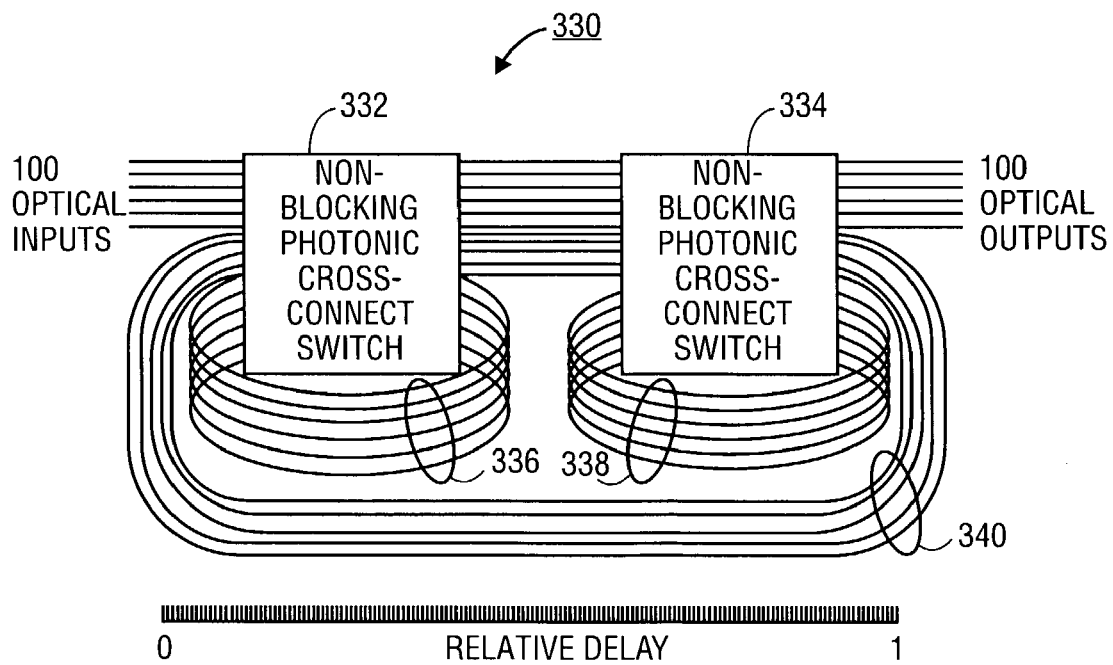
FIG. 12 shows a dual switch optical delay apparatus with multiple loops.

Another embodiment with two non-blocking photonic cross-connect switches 332 and 334 is shown as configuration 330 in FIG. 12. In configuration 330 of FIG. 12, the output 340 of the second stage 334 feeds back into the first stage 332. The loss is the same (four passes through a switch), but the number of delays is 50 times larger—i.e., 1 trillion—because the light goes though the center set of fibers twice—i.e., once through the coarse set 336 and once through the fine set 338.

All of the above approaches utilize the fact that the light goes through the switch the same number of times for any path taken. The loss for any path should be the same. Nevertheless, although the number of passes through the switch is the same for any of the different delays, there will be some variation in loss (typical sigma is 0.2 dB per pass). This loss variation could be made up by selectively mistuning the alignment of the final output mirror to adjust the loss to be equal across all ports. External variable optical attenuators can also be used to equalize loss.

Table 3 summarizes the different approaches and the loss and number of delays possible with each approach. If a lot of different delays are needed, it would appear that the double increment, double stage approach is the best one. If even more delays are needed, then a triple increment could be used, but the number of input ports drops to 75.

Of course, even larger arrays of switches can be made. A triple or quadruple stage switch can be made, but the most impact is had with two stage switches.

TABLE 3

| Number of Stages | Number of Delay Groups | Number of Input Ports | Median Loss | Number of Different Delays |
|---|---|---|---|---|
| Single stage | Single increment | 150 | 3 dB | 150 |
| Single stage | Double increment | 100 | 4.5 dB | 10,000 |
| Double stage | Single increment | 150 | 6 dB | 20 Billion |
| Double stage | Double increment | 100 | 6 dB | 1 Trillion |

Figure 13:
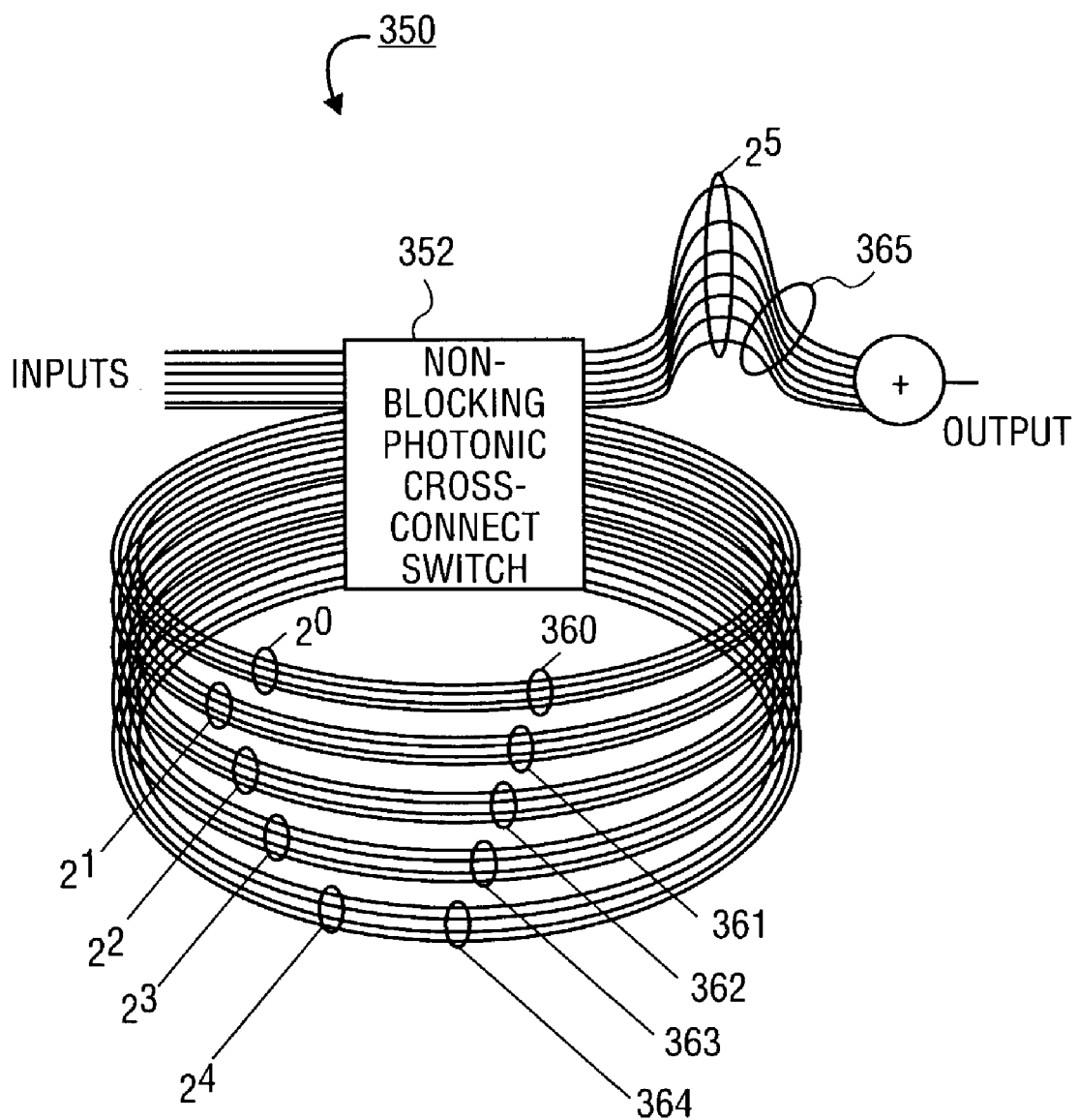
FIG. 13 shows a multiple loop optical delay apparatus with additional fixed delay provided by the output optical fibers.

Still another approach is shown in FIG. 13, wherein a different bank of delays is provided for each input. There are a total of 6 banks 360–365, or 6 bits of delay (namely, $2^0$, $2^1$, $2^2$, $2^3$, $2^4$, and $2^5$). Here, the delay introduced by routing the optical signal through the switch to the proper optical delay fiber of fibers 360–365 is supplemented by a fixed delay for each optical fiber of fibers 365.

Variations in delay between different fiberoptic delay lines can be achieved by the use of different lengths of fiber. For example, various fiber lengths, such as 8 feet, 4 feet, and 0.5 feet, are used to get measurable differences in delay. For certain embodiments, the longest fibers are 10 to 20 feet in length, with tolerances of plus or minus 0.5 to 1.0 inches. For certain embodiments, the shortest fiber length is 0.5 feet.

For alternative embodiments, another way to achieve different delays for different fiberoptic lines is to use different process variations in fabricating different fiberoptic delay lines. Such an approach results, however, in only small variations in delay (for example, on the order of 1%) for a given length of fiberoptic line.

Figure 14:
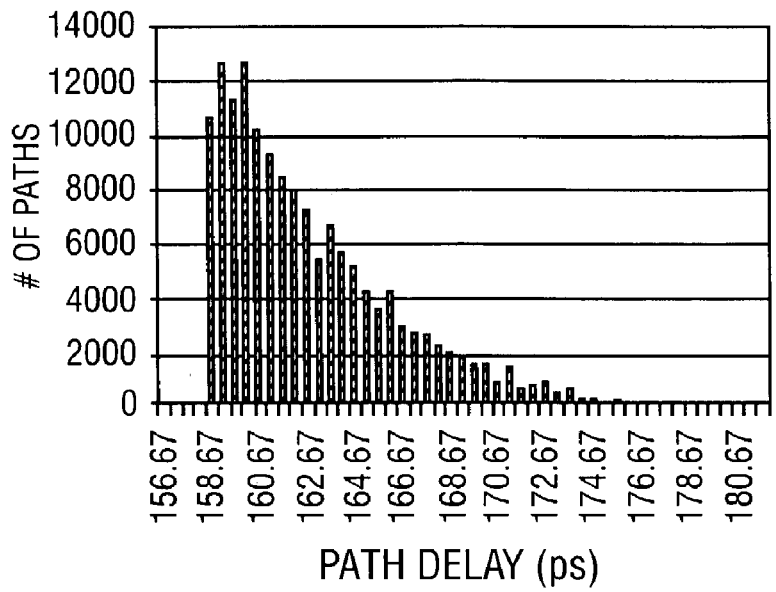
FIG. 14 shows the distribution of delays in a switch core of an optical delay apparatus.

In addition to the external fiber delays of FIG. 9 through FIG. 13, the internal delays in the switch can play an important role in providing many delay values. FIG. 14 is a path delay histogram that shows the distribution of delays within a three-dimensional optical MEMS switch. Note that there are 65,536 paths through the switch, but there are not that many distinct different delays, since many of the paths have the same length. For FIG. 14, the delays are grouped into units of 0.015 ps each. It can be seen that there are approximately 10,000 paths for small delays and there are 38 groups with over 100 delays each—i.e., enough for one delay for each input fiber in a 100 input fiber configuration. There are some applications where such small delay variations are useful. For example, the internal delay adds 5 bits of delay resolution, so the configuration in FIG. 13 could be 12 bits of delay resolution including internal delay variation. Further, the most sensitive 5 bits are real—the variation in delay is accurately known, predictable, and designable. For larger antenna arrays (3 m aperture), the delay range of ~15 ps is too small.

Figure 15:
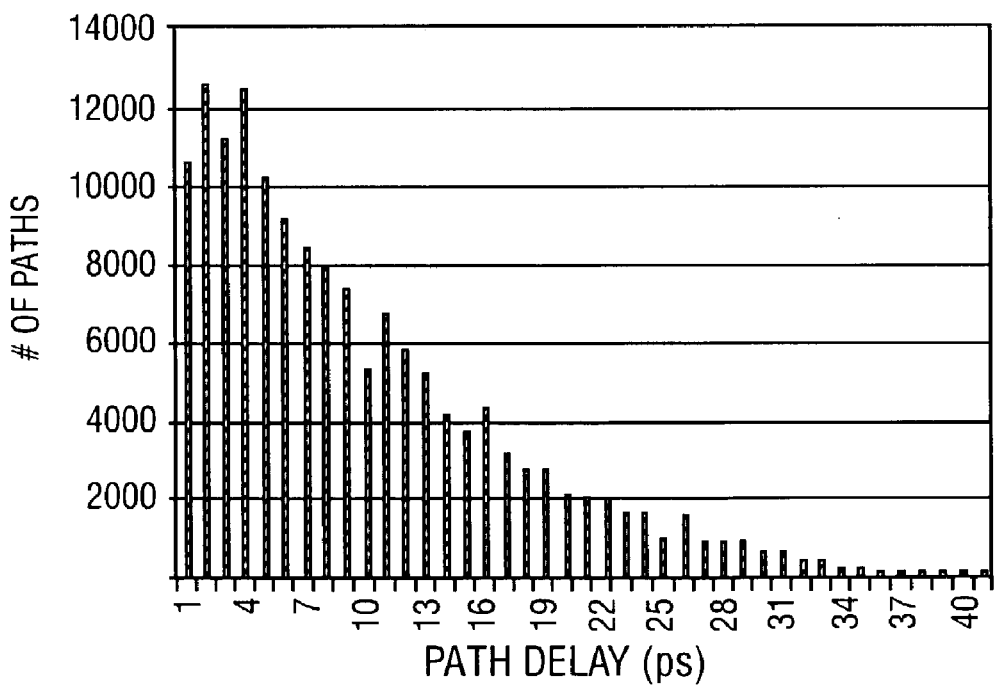
FIG. 15 shows the distribution of delays in a switch core of an optical delay apparatus after scaling the switch to a relatively larger size.

By scaling the optical switch to a larger size, however, an increased range in delays shown in FIG. 15 is obtained (grouped into units of 1 ps each), wherein the minimum delay has been subtracted from the graph for clarity. The internal path delays shown in FIG. 15 are geometrically determined, and scaling is accurate (because the paths are in free space and the velocity of light in free space is accurately known). This could be used for higher frequency arrays with many closely spaced elements, wherein smaller time resolutions are needed. For a 60 GHz phased array radar with antenna elements placed every quarter wavelength, a 100 element one-dimensional array is 12 cm across, and the minimum time increment is 3 ps.

In short, for certain embodiments, the delays between paths between MEMS mirrors within the optical switch are on the order of picoseconds. The delays provided by external fiberoptic delay lines, such as fiberoptic delay lines 304 of FIG. 9, are on the order of nanoseconds for certain embodiments. Therefore, for certain embodiments, the delays for paths between MEMS mirrors within an optical switch are relatively small in comparison to the delays provided by external fiberoptic delay lines, such as fiber delay lines 304 of FIG. 9. Thus, internal paths between MEMS mirrors can be used for small variations of delay and paths through external fiberoptic lines can be used for more significant variations in delay.

Figure 16:
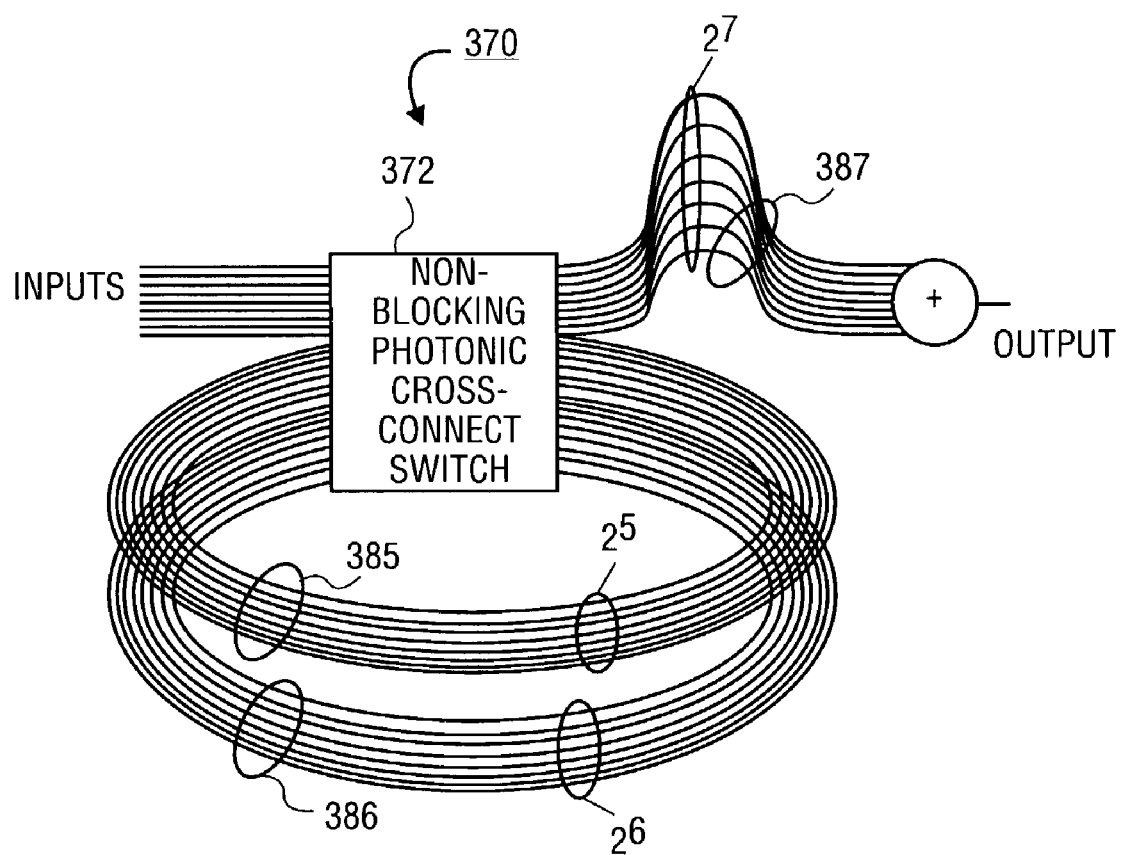
FIG. 16 shows a dual-loop optical delay apparatus with additional fixed delay provided by the output optical fibers.

FIG. 16 shows a three-dimensional MEMS switch configuration 370 for a phased array radar. The internal delays in the non-blocking photonic (optical) cross-connect switch 372 are used to get the smallest 5 bits of resolution (namely, $2^0$, $2^1$, $2^2$, $2^3$, and $2^4$). External fiber banks 385, 386, and 387 are used to get the larger 3 bits of resolution (namely, $2^5$, $2^6$, and $2^7$). In this way, it is possible to achieve very low loss, on the order of 5–6 dB, with excellent time resolution and a minimum number of elements.

For one embodiment, six hundred mirrors in optical switch 372 can be used in configuration 370 to achieve a total of 8 bits of time resolution for 100 channels. The cost per antenna port would be minimized as compared to the prior art. For one embodiment, the entire optical switch 372 could fit in 0.02 m$^3$ including control electronics. For one embodiment, the power needed to control the optical switch 372 is 50 watts, or 2 watts per antenna element. For one embodiment, all of the mirror and fiber alignments are done just once, not once per antenna element or once per mirror bounce.

Other variations in configurations of optical switches and fiberoptic delay lines are contemplated. Different numbers of fiberoptic lines, banks of fiberoptic lines, and optical switches are possible to achieve various delays.

Figure 17:
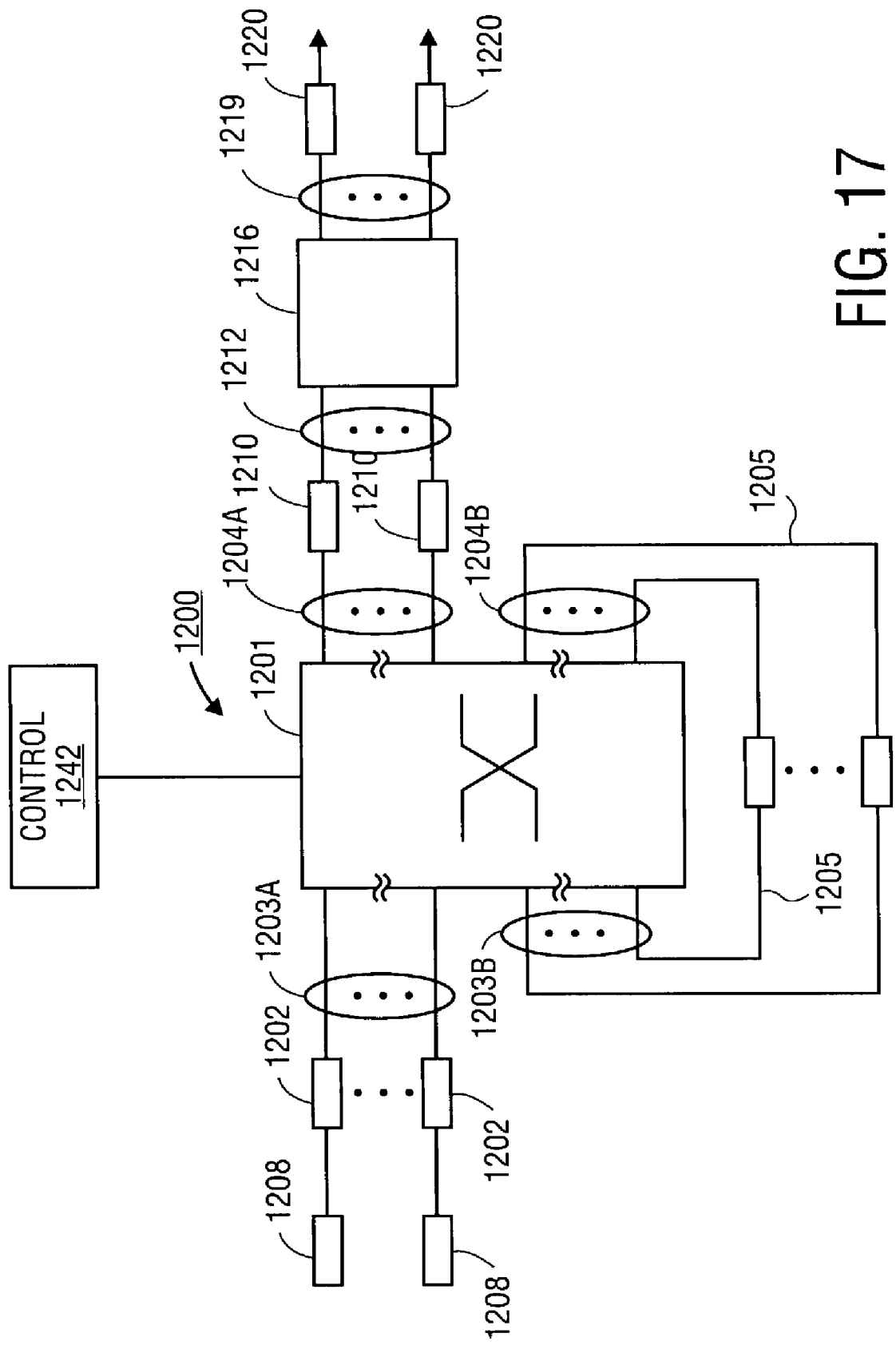
FIG. 17 shows a block diagram of one embodiment of an optical apparatus with selectable delay.

FIG. 17 shows optical selectable time delay apparatus 1200. Inputs 1203a to optical switch 1201 are a large number of input fibers 1202—for example 40 input fibers 1202. A signal on each optical input fiber 1202 is modulated at the frequency to be transmitted by the phased array radar. For one embodiment, the delay through optical switch 1201 is designed to be different depending on the internal path selected within switch 1201. In addition, optical switch 1201 has a large number of time delay fibers 1205 connecting optical switch outputs 1204b to optical switch inputs 1203b to achieve a large number of time delays by using different lengths of fiber—for example 260 time delays using 260 time delay fibers 1205.

For one embodiment, each input signal 1202 is routed through switch 1201 and optical time delay fibers 1205 twice, allowing up to ~$260^2$ combinations generating ~67,000 possible time delay values. In this case, inputs 1203a are directed to some outputs 1204b, then through delay fibers 1205 to some inputs 1203b, back through switch 1201 a second time to other outputs 1204b, though other delay lines 1205 to other inputs 1203b, and through switch 1201 a third time to outputs 1204a. This multiple routing through switch 1201 is possible because there are by design at least twice as many inputs 1203b and outputs 1204b as there are inputs 1203a and outputs 1204a.

Routing of optical signals through optical switch 1201 is controlled by control circuitry 1242, which controls the MEMS mirrors of switch 1201.

The outputs 1204a of switch 1201 are directed to delay lines 1210—in the exemplary example 40 delay lines 1210.

After being delayed by the internal delays in switch 1201, the external delays in feedback delay lines 1205, and the external delays in feedforward delay lines 1210, inputs 1212 are directed to desired outputs 1219 using switch 1216, which in the exemplary example is a non-blocking 40-by-40 port optical switch.

For other embodiments, switch 1216 could perform its switching functions using optical wavelength or other optical properties. Alternately, switch 1216 could be an electrical switch. In a phased array radar configuration, at the front end electrical signals being processed for delay are first converted to optical signals by electrical-to-optical converters 1208. On the back end, switch 1216 would direct outputs 1219 to optical-to-electrical converters 1220, then on to corresponding antenna elements (not shown).

Figure 18:
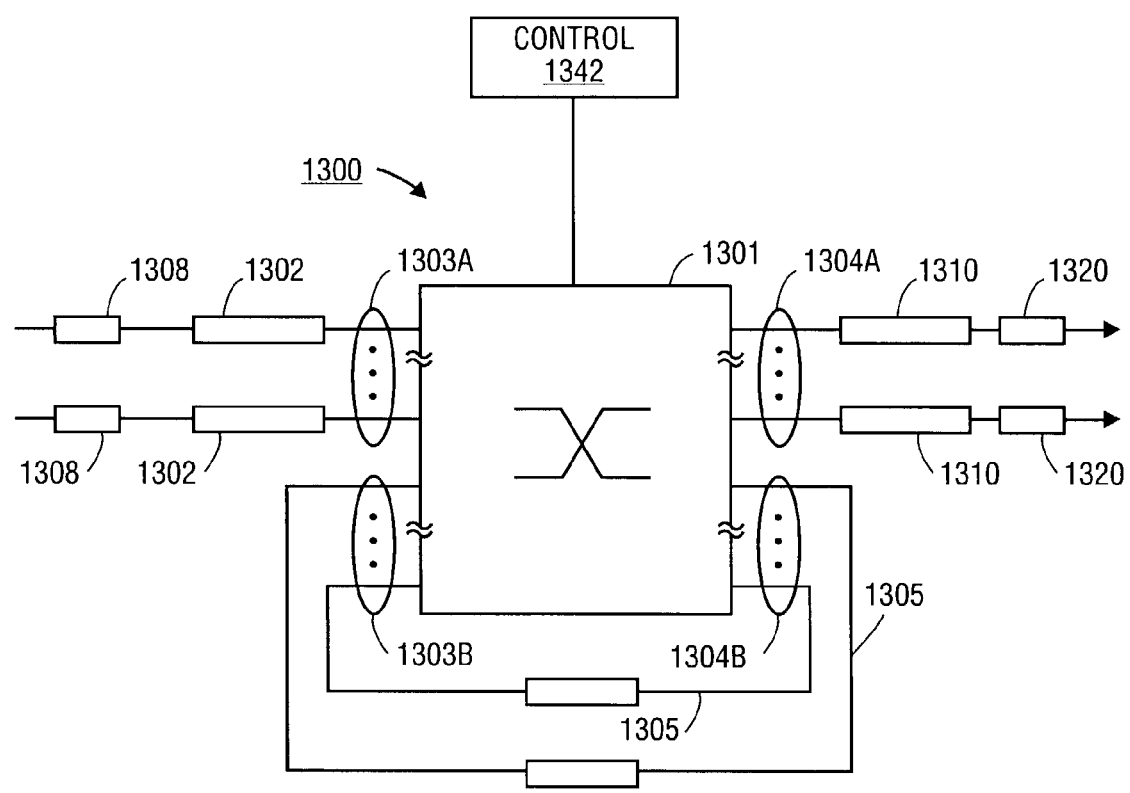
FIG. 18 shows a block diagram of another embodiment of an optical apparatus with selectable delay.

Optical variable or selectable time delay apparatus 1300 is shown in FIG. 18. The inputs 1303a of optical switch 1301 are a large number of optical input fibers 1302, for example 40 input fibers 1302, which receive optical signals corresponding to electrical transmission signals converted to optical signals by electro-optical converters 1308. Each optical input 1302 is therefore modulated at the frequency to be transmitted by a phased array radar. For one embodiment, the delay through optical switch 1301 is designed to be different depending on the internal path selected within switch 1301. In addition, optical switch 1301 has a large number of time delay fibers 1305 connecting optical switch outputs 1304b to optical switch inputs 1303b to achieve a large number of time delays by using different lengths of fiber, for example 260 time delays using 260 time delay fibers 1305.

For one embodiment, each input signal 1302 is routed through switch 1301 and optical time delay fibers 1305 twice, allowing up to ~$260^2$ combinations generating ~67,000 possible time delay values. In this case, inputs 1303a are directed to some outputs 1304b, then through delay fibers 1305 to some inputs 303b, back through switch 1301 a second time to other outputs 1304b, though other delay lines 1305 to other inputs 1303b, through switch 1301 a third time to outputs 1304a, and subsequently converted from optical to electrical signals by opto-electronic converters 1320.

The routing of optical signals through optical switch 1301 is controlled by control circuitry 1342, which controls the movable MEMS mirrors of optical switch 1301.

Figure 19:
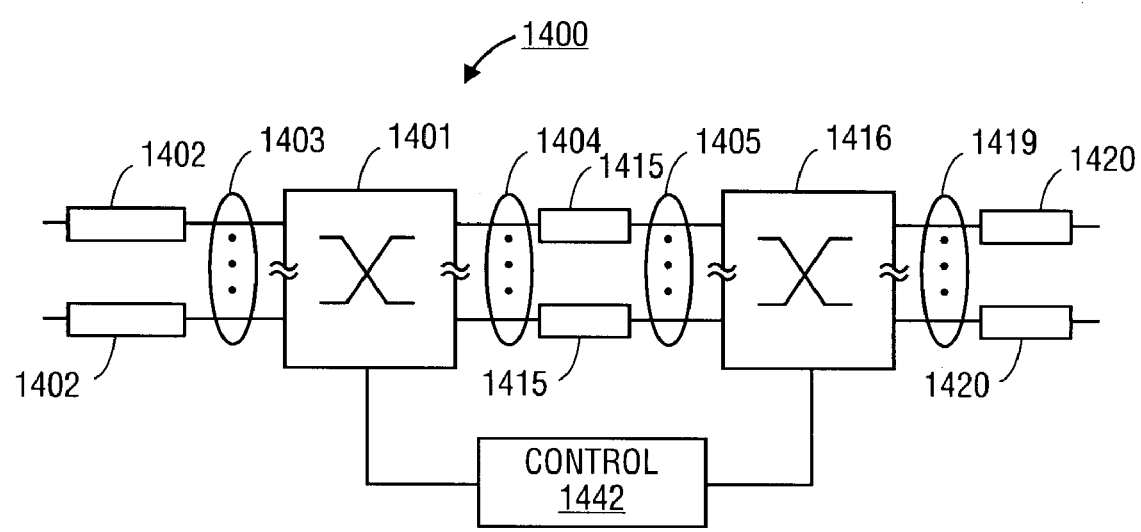
FIG. 19 shows a block diagram of another embodiment of an optical apparatus with selectable delay.

Optical variable or selectable time delay apparatus 1400 is shown in FIG. 19. The inputs 1403 of optical switch 1401 are a large number of input fibers 1402. In one example, there are 40 input fibers 1402, and optical switch 1401 has 40 input ports and 300 output ports. Again due to electro-optic conversion (not shown) each optical input 1402 is modulated at the frequency to be transmitted by the phased array radar. For one embodiment, the delay through optical switch 1401 is designed to be different depending on the internal path selected within switch 1401. The outputs 1404 of switch 1401 are directed to delay lines 1415, in the exemplary example 300 delay lines 1415. After being delayed by the internal delays in switch 1401 and the external delays in feed-forward delay lines 1415, inputs 1402 are directed to desired outputs 1419 using switch 1416, which in the exemplary example is a non-blocking 300-by-40 port optical switch, which also may have variations in internal delay. Control circuitry 1442 controls the routing through switches 1401 and 1416.

Various alternative embodiments of the invention are contemplated. For example, instead of using a MEMS photonic (optical) cross-connect switch, the core switching function may be provided by other mechanisms, such as holography, direct fiber manipulation, refraction, etc.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system for providing selectable delay, comprising:
   a first optical switch comprising:
      an input side;
      an output side;
      a plurality of movable microelectromechanical system (MEMS) mirrors;
   a second optical switch comprising:
      an input side;
      an output side;
      a plurality of movable microelectromechanical system (MEMS) mirrors;
   a plurality of input fiberoptic lines coupled to the input side of the first optical switch;
   a plurality of output fiberoptic lines coupled to the output side of the second optical switch;
   a plurality of switch-coupling fiberoptic lines coupled between the output side of the first optical switch and the input side of the second optical switch;
   a plurality of first fiberoptic delay lines with respective first ends coupled to the output side of the first optical switch and respective second ends coupled to the input side of the first optical switch;
   a plurality of second fiberoptic delay lines with respective first ends coupled to the output side of the second optical switch and respective second ends coupled to the input side of the second optical switch;
   a plurality of third fiberoptic delay lines with respective first ends coupled to the output side of the second optical switch and respective second ends coupled to the input side of the first optical switch;
   control circuitry to select delay by controlling the plurality of movable MEMS mirrors of the first and second optical switches to direct optical signals from the plurality of input fiberoptic lines through the plurality of movable MEMS mirrors of the first optical switch, the plurality of first fiberoptic delay lines, the plurality of switch-coupling fiberoptic lines, the plurality of movable MEMS mirrors of the second optical switch, the plurality of second fiberoptic delay lines, and the plurality of third fiberoptic delay lines along selectable paths having respective measurable differences in delay for the respective optical signals before the optical signals reach the plurality of output fiberoptic lines.

2. The system of claim 1, wherein each of the fiberoptic delay lines of the plurality of first, second, and third fiberoptic delay lines has a different delay characteristic.

3. The system of claim 2, wherein the different delay characteristic is due to a difference in length of the fiberoptic delay line in comparison with respective lengths of the fiberoptic delay lines of the plurality of first, second, and third fiberoptic delay lines.

4. The system of claim 1, wherein the plurality of first, second, and third fiberoptic delay lines comprise banks of fiberoptics delay lines, wherein different banks of fiberoptic delay lines have different delay characteristics, and wherein each fiberoptic delay line within each bank has substantially the same delay characteristic as each of the other fiberoptic delay lines within the same bank.

5. The system of claim 1, wherein the first and second optical switches and the plurality of first, second, and third fiberoptic delay lines provide respective delays for the optical signals, wherein the delays provided by the plurality of first, second, and third fiberoptic delay lines are greater than the delays caused by the first and second optical switches.

6. The system of claim 1, wherein the plurality of output fiberoptic lines provide respective delays for the optical signals.

7. The system of claim 1, wherein the plurality of input fiberoptic lines provide respective delays for the optical signals.

8. The system of claim 1, wherein the control circuitry controls the plurality of MEMS mirrors of the first and second optical switches to direct the optical signals through the first optical switch, the plurality of first fiberoptic delay lines, the plurality of switch-coupling fiberoptic lines, the second optical switch, the plurality of second fiberoptic delay lines, and the plurality of third fiberoptic delay lines multiple times along selectable paths before the optical signals reach the plurality of output fiberoptic lines in order to increase the delay of the optical signals.

9. The system of claim 1, wherein each of the plurality of movable MEMS mirrors of the first and second optical switches is capable of rotation in two axes.

10. The system of claim 1, wherein each of the plurality of movable MEMS mirrors of the first and second optical switches is capable of rotation in one axis.

11. The system of claim 1, wherein each of the plurality of movable MEMS mirrors of the first and second optical switches is capable of translation in one axis.

12. The system of claim 1, further comprising a plurality of lenses for the respective plurality of input fiberoptic lines, output fiberoptic lines, switch-coupling fiberoptic lines, first fiberoptic delay lines, second fiberoptic delay lines, and third fiberoptic delay lines.

* * * * *